United States Patent [19]

Citron

[11] Patent Number: 4,771,116
[45] Date of Patent: Sep. 13, 1988

[54] SILYLAMINES AS ADDITIVES IN GROUP TRANSFER POLYMERIZATION

[75] Inventor: Joel D. Citron, Wilmington, Del.

[73] Assignee: E. I. Du Pont de Nemours and Company, Wilmington, Del.

[21] Appl. No.: 44,432

[22] Filed: Apr. 30, 1987

[51] Int. Cl.$^4$ .............................................. C08F 2/00
[52] U.S. Cl. .................................... 526/194; 526/262; 526/329.7
[58] Field of Search ......................................... 526/194

[56] References Cited

U.S. PATENT DOCUMENTS

| | | | |
|---|---|---|---|
| 3,957,718 | 5/1976 | Pochert et al. | 524/876 |
| 3,997,497 | 12/1976 | Itoh et al. | 528/33 |
| 4,304,805 | 12/1981 | Packo et al. | 556/410 |
| 4,304,872 | 12/1981 | Tenhagen | 521/137 |
| 4,412,874 | 11/1983 | Huskins et al. | 149/19.2 |
| 4,414,372 | 11/1983 | Farnham et al. | 526/190 |
| 4,417,034 | 11/1983 | Webster | 526/190 |
| 4,489,191 | 12/1984 | Chung | 528/901 |
| 4,499,229 | 2/1985 | Lockhart | 528/901 |
| 4,503,209 | 3/1985 | Lucas | 528/901 |
| 4,508,880 | 4/1985 | Webster | 526/190 |
| 4,524,196 | 6/1986 | Farnham et al. | 526/190 |
| 4,539,367 | 9/1985 | Beers | 528/34 |
| 4,581,428 | 4/1986 | Farnham et al. | 526/190 |
| 4,588,795 | 5/1986 | Dicker et al. | 526/192 |
| 4,598,161 | 7/1986 | Farnham et al. | 564/101 |
| 4,605,716 | 8/1986 | Hertler | 526/190 |
| 4,622,372 | 11/1986 | Dicker et al. | 526/190 |
| 4,656,233 | 4/1987 | Hertler et al. | 526/190 |
| 4,681,918 | 7/1987 | Webster | 525/282 |
| 4,730,074 | 3/1988 | Lewis et al. | 556/470 |

OTHER PUBLICATIONS

J. Amer. Chem. Soc., 105, 5706 (1983), Webster et al.

Primary Examiner—Joseph L. Schofer
Assistant Examiner—N. Sarofin

[57] ABSTRACT

Group transfer polymerization process with respect to which a selected silylamine is employed, for example, as a scavenger to remove scavenger-reactive poisons.

12 Claims, No Drawings

4,771,116

SILYLAMINES AS ADDITIVES IN GROUP TRANSFER POLYMERIZATION

BACKGROUND OF THE INVENTION

1. Field of the Invention

This invention relates to selected silylamines which are useful, particularly as scavengers, in Group Transfer Polymerization.

2. Background

U.S. Pat. Nos. 4,414,372; 4,417,034; 4,508,880; 4,524,196; 4,581,428; 4,588,795; 4,598,161; 4,605,716; 4,622,372; 4,656,233; 4,681,918; and 4,711,942; and commonly assigned U.S. patent application Ser. No. 004,831 filed Jan. 13, 1987, referred to hereinafter as "the aforesaid patents and patent applications", disclose processes for polymerizing an acrylic or maleimide monomer to a "living" polymer in the presence of:

(i) an initiator having at least one initiating site and which is a tetracoordinate organo(Si, Sn or Ge) compound, including such compound having at least one oxygen, nitrogen or sulfur atom attached to the Si, Sn or Ge; and (ii) a co-catalyst which is a source of fluoride, bifluoride, cyanide or azide ions or a suitable Lewis acid, Lewis base or selected oxyanion. Such polymerization processes have become known in the art as Group Transfer Polymerization (Webster et al., "Group Transfer Polymerization—A New and Versatile Kind of Addition Polymerization", J. Am. Chem. Soc. 105, 5706 (1983)).

Preferred monomers for use in Group Transfer Polymerization are selected from acrylic and maleimide monomers of the formula $CH_2=C(Y)X$ and and mixtures thereof, wherein:

X is —CN, —CH=CHC(O)X' or —C(O)X';

Y is —H, —CH$_3$, —CN or —CO$_2$R, provided, however, when X is —CH=CHC(O)X', Y is —H or —CH$_3$;

X' is —OSi(R$^1$)$_3$, —R, —OR or —NR'R";

each R$^1$, independently, is a hydrocarbyl radical which is an aliphatic, alicyclic, aromatic or mixed aliphatic-aromatic radical containing up to 20 carbon atoms or —H, provided that at least one R$^1$ group is not —H;

R is:

(a) a hydrocarbyl radical which is an aliphatic, alicyclic, aromatic or mixed aliphatic-aromatic radical containing up to 20 carbon atoms;

(b) a polymeric radical containing at least 20 carbon atoms;

(c) a radical of (a) or (b) containing one or more ether oxygen atoms within aliphatic segments thereof;

(d) a radical of (a), (b) or (c) containing one or more functional substituents that are unreactive under polymerizing conditions; or (e) a radical of (a), (b), (c) or (d) containing one or more reactive substituents of the formula —Z'(O)-C—C(Y$^1$)=CH$_2$ wherein Y$^1$ is —H or —CH$_3$ and Z' is O or NR' wherein R' is as defined below; and each of R' and R" is independently selected from C$_{1-4}$ alkyl.

Preferred initiators are selected from tetracoordinate organsilicon, organotin and organogermanium compounds which may be represented by the formulas Q$_3$'MZ, Q$_2$'M(Z$^1$)$_2$ and [Z$^1$(Q')$_2$M]$_2$O wherein:

each Q', independently, is selected from —OR$^1$, —SR$^1$, —N(R$^1$)$_2$ and —R$^1$;

Z is an activating substituent selected from the group consisting of

—SR$^6$, —OP(NR'R")$_2$, —OP(OR$^1$)$_2$, —OP[OSi(R$^1$)$_3$]$_2$ and mixtures thereof;

X$^2$ is —OSi(R$^1$)$_3$, —R$^6$, —OR$^6$ or —NR'R";

R$^6$ is (a) a hydrocarbyl radical which is an aliphatic, alicyclic, aromatic or mixed aliphatic-aromatic radical containing up to 20 carbon atoms;

(b) a polymeric radical containing at least 20 carbon atoms;

(c) a radical of (a) or (b) containing one or more ether oxygen atoms within aliphatic segments thereof;

(d) a radical of (a), (b) or (c) containing one or more functional substituents that are unreactive under polymerizing conditions; or (e) a radical of (a), (b), (c) or (d) containing one or more initiating sites;

each of R$^2$ and R$^3$ is independently selected from —H and a hydrocarbyl or polymeric radical, defined as for R$^6$ above, subparagraphs (a) to (e);

R', R", R$^1$ and Z' are as defined above for the monomer;

m is 2, 3 or 4;

n is 3, 4 or 5;

Z$^1$ is wherein X$^2$, R$^2$ and R$^3$ are as defined above;

R$^2$ and R$^3$ taken together are

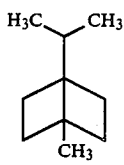

provided Z is

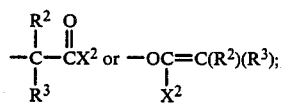

$X^2$ and either $R^2$ or $R^3$ taken together are

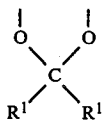

provided Z is

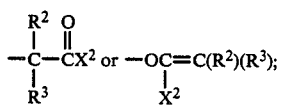

and
M is Si, Sn, or Ge.

Preferred initiators are those wherein M is Si.

Preferred co-catalysts are selected from a source of bifluoride ions $HF_2^-$; a source of fluoride, cyanide or azide ions; a source of oxyanions, said oxyanions being capable of forming a conjugate acid having a pKa (DMSO) of about 5 to about 24; a suitable Lewis acid, for example, zinc chloride, bromide or iodide, boron trifluoride, an alkylaluminum oxide or an alkylaluminum chloride; or a suitable Lewis base, for example, a Lewis base of the formula selected from $(R^4)_3M'$ and

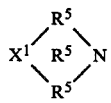

wherein:
M' is P or As;
$X^1$ is

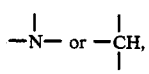

provided, however, when the monomer is a nitrile, $X^1$ is

each $R^4$, independently, is:

(a) a $C_{1-12}$ alkyl, $C_{4-12}$ cycloalkyl, $C_{6-12}$ aralkyl or di($C_{1-4}$ alkyl)amino group;

(b) a group of (a) wherein two or three of the alkyl, cycloalkyl and/or aralkyl groups are joined together by means of one or more carbon-carbon bonds;

(c) a group of (a) or (b) wherein the alkyl, cycloalkyl and/or aralkyl groups contain within aliphatic segments thereof one or more hetero atoms selected from O, N and S; or (d) a group of (a), (b) or (c) wherein the alkyl, cycloalkyl and/or aralkyl groups contain one or more substituents that are unreactive under polymerizing conditions; and each $R^5$ is $-CH_2CH_2-$ or $-CH_2CH_2-$ containing one or more alkyl or other substituents that are unreactive under polymerizing conditions.

Additional details regarding Group Transfer Polymerization can be obtained from the aforesaid patents and patent applications, the disclosures of which are hereby incorporated by reference.

U.S. Pat. Nos. 4,489,191; 4,499,229; 4,503,209 and 4,539,367 disclose selected silanes, including silylamines, as scavengers of hydroxy functional materials in moisture-curable silicone room temperature vulcanizable (RTV) compositions. For example, '191 discloses silane scavengers of the formula

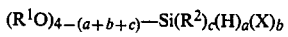

wherein:

$R^1$ is alkyl, alkylether, alkylester, alkylketene, alkylcyano or aralkyl;

$R^2$ is hydrocarbyl or a moiety selected from Si, O, S, N, P, C, B, Sn, Pb, Ca, hydrazine, azo, CO, $CO_2$, organic peroxides and metal oxides;

X is a hydrolyzable leaving group selected from amido, amino, carbamato, enoxy, imidato, isocyanato, oximato, thioisocyanato and ureido radicals;

a is 1–4;
b is 0 or 1–3;
c is 0 or 1–3;
4−(a+b+c) is 0 or 1–3.

It is an object of this invention to provide selected silylamines which can be used, particularly as scavengers, in Group Transfer Polymerization. Another object is to provide silylamines which are not deleterious to Group Transfer Polymerization or to the polymer produced thereby and which can be added directly to the polymerization reaction mixture or, alternatively, can be used to treat and/or purify the reactants and other ingredients employed in Group Transfer Polymerization. These and other objects will become apparent hereinafter.

Commonly assigned U.S. patent application Ser. No. 044,881 discloses the use of some of the silylamines described herein as initiators of (meth)acrylate polymerization. It is to be understood that the invention herein is considered separate and distinct from any invention disclosed and claimed in the commonly assigned application, about which more will be discussed hereinafter.

DETAILED DESCRIPTION OF THE INVENTION

The invention herein resides in a Group Transfer Polymerization process comprising contacting under polymerizing conditions at least one monomer selected from acrylic and maleimide monomers with (i) a tetracoordinate organosilicon, organotin or organogermanium polymerization initiator having at least one initiating site, and (ii) a co-catalyst which is a source of fluoride, bifluoride, cyanide or azide ions or a selected oxyanion, the process further characterized in that a selected silylamine is present before and/or during the polymerization, the silylamine being of the formula:

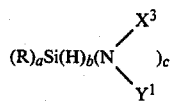

wherein:
each R, independently, is $C_{1-18}$ n-alkyl, n-alkenyl or n-alkynyl;
$X^3$ is —H or $C_{1-12}$ n-alkyl;
$Y^1$ is —H, $C_{1-12}$ n-alkyl, aryl or alkaryl;
a is 1, 2 or 3;
b is 0 or 1;
c is 1 or 2;
(a+b+c) is 4;
$X^3$ and $Y^1$ taken together with —N< form a 5- or 6-membered saturated heterocyclic ring or a 5- or 6-membered heterocyclic ring containing one or more substituents that are inert under polymerizing conditions;
provided, however, if $Y^1$ is aryl or alkaryl, then $X^3$ is $C_{1-12}$ n-alkyl; and provided, however, if a is 3 and c is 1, then each of $X^3$ and $Y^1$, taken independently, is —H or —$CH_3$.

Preferably, $X^3$ and $Y^1$ taken together with —N< form the compound of the formula

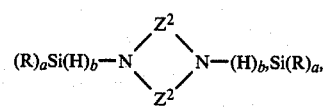

wherein:
R, a and b are defined as above;
each $Z^2$, independently, is $C_{1-2}$ alkylene;
a' and b' are defined as for a and b, respectively; and (a'+b') is 3.

Preferred silylamines are of the above formula wherein b is 1. Also preferred are silylamines of the formula wherein b and b' are 1.

Preferably, the polymerization ingredients are pretreated with excess silylamine before use to ensure removal of Group Transfer Polymerization "poisons". In this preferred embodiment, since excess silylamine is employed, it will be present during the polymerization. In still another embodiment, for example, when the polymerization ingredients are already purified, it may be advantageous to have the silylamine present during the polymerization, for example, to ensure removal of poisons which may enter adventitiously during polymerization.

The presence of the selected silylamine of the invention permits Group Transfer Polymerization to be carried out in a more reproducible and controllable manner, thus providing more reproducible polymeric products. A still further and unexpected feature of this invention is that the selected silylamine does not adversely affect the polymerization, nor does it alter the characteristics of the polymeric product normally obtained by means of Group Transfer Polymerization.

The selected silylamine of the aforesaid formula is useful for removing any "poison", that is, any material that adversely affects Group Transfer Polymerization or the polymeric products produced thereby, provided the poison is reactive with the silylamine, and provided the reaction product thus formed is not itself a poison. Impurities which retard or "poison" Group Transfer Polymerization and which are removed by the scavenging action of the selected silylamine of the invention include but are not limited to hydroxyl-containing substances such as water, alcohols, carboxylic acids, phenolic compounds and the like. It should be noted that not all silylamines are operable scavengers in Group Transfer Polymerization.

When the silylamine is employed in the polymerization system, that is, is present in the polymerization reaction mixture, about 0.01 to 3% (by weight) of the silylamine is added to the solvent(s) and/or monomer(s) before or just at the start of the polymerization. About 0.03 to 1% of silylamine (based on the material being purified) is preferred. Preferably, a sufficient amount of silylamine, as a scavenger, is added so that there is some active material still present at the end of the polymerization. It is preferred, but not necessary, that about 10-2,000 ppm of polymerization catalyst also be present during scavenging. Although the temperature is not critical, the lower the temperature, the slower the scavenging reaction(s). It is convenient to carry out the scavenging at ambient temperature.

Scavenging of the ingredients by treatment with the silylamine prior to polymerization can be carried out under an inert atmosphere (e.g., nitrogen) so as avoid introducing more poisons, such as water. Scavenging before polymerization can be carried out for a few minutes to several days, depending on the particular scavenger chosen; whether a catalyst (of the polymerization system) is used to accelerate the scavenging reaction(s); and the suspected level of poison(s). Solvent(s), initiator(s), monomer(s) and any other ingredients should preferably first undergo a preliminary purification so that very large amounts of scavenger are not needed. Such methods of prepurification are well known to those skilled in the art and include, e.g., passage over a molecular sieve or activated alumina and removal of moisture by azeotropic distillation. The preferred method is to scavenge all major ingredients before polymerization initiator is admixed with any ingredient.

Some of the silylamines which are useful in the present invention are also capable of initiating polymerization of the acrylic or maleimide monomers when polymerization catalyst is also present. With such silylamines, therefore, care must be exercised, when pretreating monomer with the silylamine, to avoid or minimize the presence of catalyst and thus avoid the risk of uncontrolled exothermic polymerization. In particular, azide, cyanide or phenolate ions, and tetraalkylammonium fluoride and tetraalkylammonium bifluroide catalysts should not be present. It is to be understood that there is no intent to claim herein the use of any silylamine as a polymerization initiator.

Not all catalysts disclosed in the aforesaid patents and applications are operable in the present polymerization process. Specifically, Lewis acids and Lewis bases should be avoided. Oxyanion catalysts which are useful in the present process are those described in U.S. Pat. No. 4,588,795. Monomers and initiators which are useful in the present polymerization process are those described in the aforesaid patents and applications.

Some of the silylamines of the invention are more active as scavengers than others. Although not wishing to be bound by this explanation, it is believed that this is due mainly to steric effects, a concept well known to those skilled in the art. More specifically, silylamines in which the silicon atom is less sterically hindered are believed to be more reactive than those which are more sterically hindered. For example, when b in the above formula is 1, steric hindrance around the silicon is reduced. Similarly, when R is $C_{1-4}$ n-alkyl, preferably methyl, and/or $X^3$ and $Y^1$ are H or $C_{1-4}$ n-alkyl, preferably methyl, steric hinderance is also reduced. Thus, less sterically hindered silylamines will require less time to remove (scavenge) poison(s). Also, the use of polymerization catalyst to assist in the scavenging process is particularly desirable with less reactive silylamines, in order to reduce the amount of time necessary to scavenge to low poison levels. With all silylamines, however, the use of catalyst shortens the scavenging process.

In the following experiment and examples, unless otherwise noted, all temperatures are in degrees Celsius. All solvents and monomers were first purified by passage over Woelm neutral activated alumina. All transfers were by syringe or other similar anyhydrous methods. Purified materials were stored and the reactions were carried out under nitrogen. All glassware except thermometers was heated at 155° C. overnight before use. Storage vessels and glassware associated with the reaction vessel were also flamed under nitrogen. Reactions were carried out in 250 mL, 3-necked round bottomed flasks equipped with a rubber septum, thermometer, nitrogen inlet and magnetic stirring bar (Teflon encapsulated). Polymer was isolated by removing volatiles in a vacuum oven at 60°-70° C. The following abbreviation are used:

GPC: gel permeation chromatography
$\overline{M}_n$: number average molecular weight (via GPC)
$\overline{M}_w$: weight average molecular weight (via GPC)
MMA: methyl methacrylate
MTS: [(1-methoxy-2-methyl-1-propenyl)oxy]trimethylsilane
MWD: $\overline{M}_w/\overline{M}_n$
PMMA: poly(methyl methacrylate)
TAS: a 1 molar solution of tris(dimethylamino)sulfonium bifluoride in acetonitrile
THF: tetrahydrofuran In many of the following examples, methanol was added to act as a "model" poison. As disclosed in the aforesaid patents and patent applications, methanol can be used to quench the polymerization. In the following examples, enough methanol was added to completely destroy the initiator (see Experiment 1).

EXPERIMENT 1

This experiment illustrates the effect of a controlled amount of "poison" (methanol) on a polymerization in the absence of the silylamine. To the reaction flask was added 100 mL of THF and 100 μL of methanol. About 2.3 h later, 0.5 mL of MTS and 100 μL of TAS was added, at which time a small (~0.5°) exotherm occurred. Then, 35 mL of MMA was added over 34 min, during which time there was no exotherm. Removal of volatiles showed that no polymer was produced.

EXAMPLE 1

To the reaction flask was added 100 mL of THF, 1.0 mL of N-trimethylsilylpyrrolidine (commercially available from Petrarch Systems, Inc.), 100 μL of methanol and 50 μL of TAS. After stirring for 3.75 h, 0.50 mL (2.5 mmol) of MTS was added. Then, 35 mL of MMA was added over 57 min. After 25 mL of the MMA had been added, 50 μL of TAS was added. The reaction temperature peaked at 52°. At the end of the MMA addition, 25 μL of TAS was added. After standing overnight, 1.0 mL of methanol was added and the polymer was isolated. Yield of PMMA was 35.0 g; $\overline{M}_n$ 12,700 (theoretical 13,500), MWD 1.50. The GPC curve was slightly bimodal.

EXAMPLE 2

This example illustrates the "living" end character of the polymer in the presence of the silylamine. To the reaction flask was added 100 mL of THF, 0.3 mL of N-trimethylsilylpyrrolidine and 50 μL of TAS. About 1.7 h later, 0.3 mL of MTS was added to the flask. Meanwhile, a solution of 0.2 mL of N-trimethylsilylpyrrolidine in 40 mL of MMA was made up, and 10 min later, addition of 20 mL of that solution to the flask was started. The addition took 16 min, during which time the temperature rose to 43°. After stirring about one h, a sample was removed for GPC analysis (Sample A), and then 15 mL more of the above MMA solution was added over 16 min. During this time, another 25 μL of TAS was added and the temperature rose from 25° to 43°. After stirring overnight, Sample B was taken for GPC analysis.

| Sample | $\overline{M}_n$ (Theoretical) | $\overline{M}_n$ (Found) | MWD (Found) |
|---|---|---|---|
| A | 12,900 | 12,100 | 1.15 |
| B | 22,500 | 22,000 | 1.28 |

The polymer's "living" end character is shown by the analytical results combined with the one hour delay between MMA additions.

EXAMPLE 3

Into the reaction flask was added 100 mL of THF, 1.0 mL of bis(dimethylamino)methylsilane (commercially available from Petrarch Systems, Inc.) and 100 μL of methanol. About 2.5 h later, 0.5 mL of MTS and 50 μL of TAS were added. Then, 35 mL of MMA was added over 28 min. During this time, one 50 μL portion and two 25 μL portions of TAS were added and the temperature rose from 22.5° to 52.5°. About 1.3 h after the MMA addition was complete, 0.5 mL of methanol was added and a sample was taken. The yield of polymer was 31.9+g (some solution was spilled and lost); $\overline{M}_n$ 12,400 (theoretical 13,500), MWD 1.20.

EXAMPLE 4

To the reaction flask was added 100 mL of THF, 1.0 mL of N,N'-bis(trimethylsilyl)piperazine (commercially available from Petrarch Systems, Inc.), 100 μL of methanol and 50 μL of TAS. After stirring about 3 h, 0.5 mL of MTS was added and the solution turned light pink. Then, 35 mL of MMA was added over 33 min, during which time the temperature rose from 23° to 51°. About 1.5 h later, 1.0 mL of methanol was added and the polymer was isolated. The yield of PMMA was 35.3 g; $\overline{M}_n$ 12,600 (theoretical 13,500), MWD 1.20.

EXAMPLE 5

To the reaction vessel was added 100 mL of THF, 1.0 mL of bis(n-butylamino)dimethylsilane (commercially available from Petrarch Systems, Inc.) 100 μL of methanol and 50 μL of TAS. After stirring for 3 h, 0.5 mL of MTS and 50 μL of TAS were added. Then, 35 mL of MMA was added over 27 min; the temperature rose from 23° to 51°. About 1 h after the MMA addition was complete, 0.5 mL of methanol was added. The isolated polymer weighted 34.9 g; $\overline{M}_n$ 14,200 (theoretical 13,500), MWD 1.28.

EXAMPLE 6

The the reaction flask was added 100 mL of THF, 1.0 mL of N-trimethylsilylpiperidine (commercially available from Petrarch Systems, Inc.), 100 μL of methanol and 50 μL of TAS. About 3.5 h later, 0.5 mL of MTS and 100 μL of TAS were added. Then, 35 mL of MMA was added over 29 min and the temperature rose from 24° to 53°. About 1 h after the MMA addition was complete, 0.5 mL of methanol was added. The yield of PMMA was 35.7 g; $\overline{M}_n$ 17,500 (theoretical 13,500), MWD 1.28.

EXAMPLE 7

To the flask was added with stirring 100 mL of THF, 1.0 mL of dimethylaminotrimethylsilane (commercially available from Petrarch System, Inc.) and 100 μL of methanol. After about 3 h, 0.5 mL of MTS and 100 μL of TAS were also added. Then, 35 mL of MMA was added over 29 min, during which time the temperature rose from 22.5° to 52.5°. Then, 0.5 mL of methanol was added and the polymer was isolated. The PMMA recovered weighed 35.5 g; $\overline{M}_n$ 20,900 (theoretical 13,500), MWD 1.36.

EXAMPLE 8

This example illustrates the ability of the silylamine to remove poisons that are introduced as the polymerization is being carried out. In such cases, because of the addition of the poison(s), $\overline{M}_n$ should be close to theoretical, but the MWD should be broad (higher number) because "living" ends are being destroyed during the polymerization by the added poison(s).

Two experiments were carried out consecutively, one with silylamine present and one without (a control).

A. To the reaction flask was added 100 mL of THF, 0.5 mL of diethylaminodimethylsilane (commercially available from Petrarch Systems, Inc.), 0.5 mL of MTS, and 100 μL of TAS. Then, 35 mL of a solution of 40 mL of MMA and 50 μL of methanol was added over 28 min. During this time, the temperature rose from 24° to 47°. After the MMA addition, 0.5 mL of methanol was added and the polymer was isolated.

B. To the reaction flask was added 100 mL of THF, 0.5 mL of MTS, and 100 μL of TAS. Then, 35 mL of a solution of 40 mL of MMA and 50 μL of methanol were added over 28 min. During this time, one 50 μL and one 25 μL portion of TAS were added and the temperature rose from 23° to 52.5°. After the MMA addition was complete, 0.5 mL of methanol was added and the polymer was isolated.

The properties of the isolated polymers are given below. The difference in the MWD between A and B shows that the diethylaminodimethylsilane acted as a scavenger for the methanol poison during the polymerization.

|   | Yield (g) | $\overline{M}_n$ | $\overline{M}_w$ | $\overline{M}_z$* | MWD |
|---|---|---|---|---|---|
| A | 33.6 | 16,900 | 21,300 | 27,900 | 1.26 |
| B | 27.1 | 15,500 | 26,800 | 43,700 | 1.72 |

*Viscosity average molecular weight.

EXAMPLE 9

To the reaction flask was added with stirring 100 mL of THF, 1.0 mL of N-trimethylsilyl-N-methylaniline, 100 μL of methanol and 50 μL of TAS. After about 3 h, 0.5 mL of MTS and 100 μL of TAS were added. Then, 35 mL of MMA was added over 29 min, during which time 50 μL of TAS was added. The temperature rose from 23° to 34°. The polymerization was allowed to stir overnight and then 0.5 mL of methanol was added and the polymer was isolated. The yield of PMMA was 30.3 g; $\overline{M}_n$ 15,900, MWD 1.53.

EXAMPLE 10

To the reaction flask was added 100 mL of THF, 0.1 mL of bis(dimethylamino)methylsilane (commercially available from Petrarch Systems, Inc.) and 10 μL of TAS. To 40 mL of purified (over alumina) MMA in a separate Erlenmeyer flask was added 0.2 mL of bis(-dimethylamino)methylsilane and 10 μL of TAS. About 2.7 h later, 50 μL of MTS and 25 μL of TAS were added to the THF. Then, 26.5 mL of the above MMA was added by syringe to the THF over 22 min. During this time, one 25 μL portion of TAS was added and the temperature rose to 50.5°. At the end of the MMA addition, 10 μL more of TAS was added. About 0.6 h after the MMA addition was complete, 0.5 mL of methanol was added and the polymer was isolated. The yield of PMMA was 24.5 g; $\overline{M}_n$ 103,000, MWD 1.47.

A similar experiment carried out without the bis(-dimethylamino)methylsilane yielded no polymer, presumably due to the presence of trace amounts of poison(s).

EXAMPLE 11

To the reaction flask was added 100 mL of THF, 1.0 mL of dimethylsilyldimethylamine (commercially available from Petrarch Systems, Inc.), 100 μL of methanol and 10 μL of TAS. About 3.3 h later, 0.5 mL of MTS and 50 μL of TAS were added. Then, 30 mL of ethyl acrylate was added by syringe over 28 min. During this time, three 50 μL portions of TAS were added and the temperature rose to 38.5°. After the ethyl acrylate addition was complete, 3 more 50 μL portions of TAS were added. About 1.1 h after the ethyl acrylate addition was complete, 1.0 mL of methanol was added and the product was isolated; 16.5 g of poly(ethyl acrylate) was obtained; $\overline{M}_n$ 9590, MWD 2.00 (using a PMMA calibration).

EXAMPLE 12

To the reaction flask was added 100 mL of toluene, 1.0 mL of bis(n-butylamino)dimethylsilane, 100 μL of methanol and 50 μL of TAS. After 4.3 h, 0.5 mL of MTS and 50 μL of TAS were added. Then 35 mL of 2-ethylhexyl methacrylate was added over 13 min. During this time, one 50 μL and one 25 μL portion of TAS were added and the temperature rose to 45.5°. About 1.2 h after the 2-ethylhexyl methacrylate addition was complete, 1.0 mL of methanol was added and the polymer was isolated; 30.6 g of poly(2-ethylhexyl methacrylate) was recovered; $\overline{M}_n$ 8800, MWD 1.57 (using a PMMA calibration).

EXAMPLE 13

To the reaction flask was added 100 mL of THF, 1.0 mL of bis(dimethylamino)methylsilane, 100 μL of methanol and 50 μL of a 1M solution of tetrabutylammomium benzoate in THF. After about 3.1 h, 0.5 mL of MTS and 100 μL of 1M tetrabutylammonium benzoate in THF were added. Then, 35 mL of MMA was added by syringe over 28 min. During this time, the temperature rose to 54°. About 1.7 h after the MMA addition was complete, 0.5 mL of methanol was added and the polymer was isolated; 33.9 g of PMMA was recovered; $\overline{M}_n$ 16,500, MWD 2.35.

EXAMPLE 14

To the flask was added 100 mL of THF, 100 μL of methanol, 1.0 mL of bis(dimethylamino)methylsilane, and 20 μL of 0.5M tetrabutylammonium p-cyanobenzoate solution. Then, 35 mL of MMA was added over 27 min. During this time, one 50 μL and one 100 μL portion of the tetrabutylammonium p-cyanobenzoate solution were added and the temperature rose from 20.5° to 23°. About 1.3 h after the MMA addition was complete, 0.5 mL of methanol was added and the polymer was isolated; 13.6 g of PMMA was recovered.

EXAMPLE 15

To the flask was added 100 mL of THF, 100 μL of methanol, 10 μL of bis(dimethylamino)methylsilane and 10 μL of a 0.5M solution of tetrabutylammonium m-chlorobenzoate in acetonirile. After about 3.5 h, 0.5 mL of MTS and 100 μL of the tetrabutylammonium m-chlorobenzoate were added. Then, 35 mL of MMA was added by syringe over 27 min, during which time the temperature rose from 23° to 53.5°. About 50 min after the MMA addition was complete, 0.5 mL of methanol was added and the polymer was isolated; 35.1 g of PMMA was recovered; $\overline{M}_n$ 11,900 (theoretical 13,500), MWD 1.12.

EXAMPLE 16

To the flask was added 100 mL of THF, 100 μL of methanol, 1.0 mL of bis(dimethylamino)methysilane, and 20 μL of a saturated solution of tetrabutylammonium biacetate in acetonitrile. After about 3.3 h, 0.5 mL of MTS and 150 μL of the tetrabutylammonium biacetate solution were added. Then, 35 mL of MMA was added by syringe over 20 min, during which time the temperature rose from 21.5° to 50°. About 2 h later, 0.5 mL of methanol was added and the polymer was isolated; 35.1 g of PMMA was recovered; $\overline{M}_n$ 14,900 (theoretical 13,500), MWD 2.33.

EXAMPLE 17

To the flask was added 100 mL of THF, 100 μL of methanol, 1.0 mL of bis(dimethylamino)methylsilane and 20 μL of a 0.5M solution of tetrabutylammonium m-nitrophenolate in acetonitrile. Upon addition of the m-nitrophenolate the solution turned a rosé color. Four h later, 0.5 mL of MTS AND 100 μL of the m-nitrophenolate solution were added (the solution was now amber). Then, 35 mL of MMA was added over 27 min, during which time the temperature rose from 22° to 52°. About 1.2 h after the MMA addition was complete, 0.5 mL of methanol was added and the polymer was isolated; 34.4 g of PMMA was recovered; $\overline{M}_n$ 16,100 (theoretical 13,500), MWD 1.60.

I claim:

1. Group Transfer Polymerization process comprising contacting under polymerizing conditions at least one monomer selected from acrylic and maleimide monomers with (i) a tetracoordinate organosilicon, organotin or organogermanium polymerization initiator having at least one initiating site, and (ii) a co-catalyst which is a source of fluoride, bifluoride, cyanide or azide ions or selected oxyanion, the process further characterized in that a selected silylamine is present before and/or during the polymerization, the silylamine being of the formula:

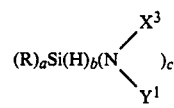

wherein:
each R, independently, is $C_{1-18}$ n-alkyl, n-alkenyl or n-alkynyl;
$X^3$ is —H or $C_{1-12}$ n-alkyl;
$Y^1$ is —H, $C_{1-12}$ n-alkyl, aryl or alkaryl;
a is 1, 2 or 3;
b is 0 or 1;
c is 1 or 2;
(a+b+c) is 4;
$X^3$ and $Y^1$ taken together with —N< form a 5- or 6-membered saturated heterocyclic ring or a 5- or 6-membered heterocyclic ring containing one or more substituents that are inert under polymerizing conditions;

provided, however, if $Y^1$ is aryl or alkaryl, then $X^3$ is $C_{1-12}$ n-alkyl; and provided, however, if a is 3 and c is 1, then each of $X^3$ and $Y^1$, taken independently, is —H or —$CH_3$.

2. Process of claim 1 wherein $X^3$ and $Y^1$ taken together with —N< form the compound of the formula

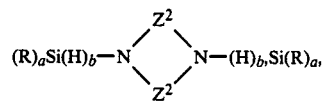

wherein:
R, a and b are defined as in claim 1; each $Z^2$, independently, is $C_{1-2}$ alkylene;
a' is 1, 2 or 3;
b' is 0 or 1; and
(a'+b') is 3.

3. Process of claim 2 wherein at least one of b and b' is 1.

4. Process of claim 1 carried out in the presence of the silylamine.

5. Process of claim 1 wherein ingredients used therein are pre-treated with the silylamine.

6. Process of claim 1 wherein b is 1.

7. Process of claim 1 wherein $X^3$ and $Y^1$, independently, are $C_{1-4}$ alkyl or H.

8. Process of claim 5 wherein R is methyl.

9. Process of claim 5 wherein $X^3$ and $Y^1$, independently, are $C_{1-4}$ alkyl or H.

10. Process of claim 6 wherein $X^3$ and $Y^1$, independently, are $C_{1-4}$ alkyl or H.

11. Process of claim 8 wherein $X^3$ and $Y^1$, independently, are $C_{1-4}$ alkyl or H.

12. Process of claim 1 wherein the monomer is an acrylic monomer.

* * * * *